(No Model.)
J. A. MALONEY.
VEHICLE TIRE.
No. 566,597.  Patented Aug. 25, 1896.
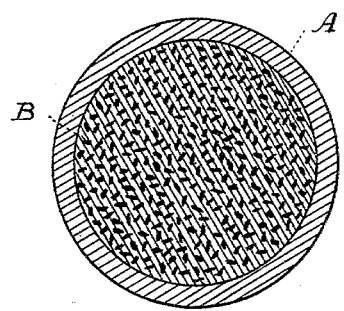
Witnesses.
Philip C. Masi
Jessie L. Leddon
Inventor.
James A. Maloney
by E. W. Anderson
his Attorney.

UNITED STATES PATENT OFFICE.

JAMES A. MALONEY, OF WASHINGTON, DISTRICT OF COLUMBIA.

VEHICLE-TIRE.

SPECIFICATION forming part of Letters Patent No. 566,597, dated August 25, 1896.

Application filed June 20, 1896. Serial No. 596,332. (No model.)

*To all whom it may concern:*

Be it known that I, JAMES A. MALONEY, a citizen of the United States, and a resident of Washington, in the District of Columbia, have invented certain new and useful Improvements in Vehicle-Tires; and I do declare the following to be a full, clear, and exact description of the invention, such as will enable others skilled in the art to which it appertains to make and use the same.

This invention has relation to vehicle-tires and to a certain new and useful composition of matter for use in the manufacture of the same.

The object of the invention is to provide a tire which shall possess to a high degree the resilient properties demanded in an article of this kind and approximating that of air, as used in an ordinary pneumatic tire, without being subject to the great objection to which such tires are subject, viz., the loss of efficiency by puncture.

With this object in view, the invention consists in a tire having an outer case or covering of rubber or like material and a filling of plastic material possessing resilient properties to a high degree.

It also consists in the novel composition of matter employed for such filling.

The accompanying drawing shows a cross-section of a tire filled with the composition, the letter A indicating the outer tube or covering, and B the filling.

This composition of matter consists in the following ingredients, combined in the proportions stated or in such other proportions as may be found suitable, to wit: glue, seven parts; linum, one part; fine bran, five parts. I prefer to combine these ingredients as follows: The glue is placed in a receptacle and is covered with cold water. This receptacle is placed in boiling water in a second receptacle, where it is allowed to remain until the glue obtains a viscosity about equal to that of molasses. The infusion of linum (preferably cold) is next added slowly, the mixture being stirred. The bran is then added slowly and is thoroughly mixed with the other ingredients by stirring. The resultant mixture, after having been properly molded and set, is ready for use.

I may also, if desired, add to the ingredients above named a small quantity of lycopodium, about one-half of a part in the proportions selected; also, about one part of glycerin.

Lycopodium may be used entirely in lieu of bran, but the latter is preferred for the reason that the composition when made with lycopodium is somewhat too stiff for all tires.

In place of linum I may use some other mucilaginous substance, such as an infusion of elm-bark. Linum is, however, preferred.

The material resulting from this mixture is of plastic character, of a density less than that of soft rubber, and possessing a high coefficient of resiliency. The bran used not only reduces the density and specific gravity of the composition, but it also assists in giving it the proper body and character. When lycopodium is added, its effect is to increase the degree of stiffness of the composition.

By the term "linum," wherever employed herein, I refer to an infusion made from the ordinary flaxseed of commerce. This infusion is prepared by immersing the seed in cold water for a proper length of time.

Having thus described my invention, what I claim as new, and desire to secure by Letters Patent, is—

1. A filling for tires, composed of glue, a mucilaginous substance, and a light comminuted vegetable material insoluble in either the glue or mucilaginous substance, substantially as specified.

2. The herein-described composition of matter for use in the manufacture of vehicle-tires, consisting of glue, linum and fine bran substantially as specified.

3. The herein-described composition of matter for use in the manufacture of vehicle-tires, consisting of glue, linum, fine bran and glycerin substantially as specified.

4. The herein-described composition of matter for use in the manufacture of vehicle-tires, consisting of glue, fine bran, linum glycerin and lycopodium, substantially as specified.

5. A vehicle-tire consisting of an outer tube or casing of rubber or the like, and a filling therefor composed of glue, a mucilaginous substance, and fine bran, substantially as specified.

In testimony whereof I affix my signature in presence of two witnesses.

JAMES A. MALONEY.

Witnesses:
   PHILIP C. MASI,
   GEORGE H. PARMELEE.